Nov. 22, 1960  G. E. BULLOCK  2,961,129
PLANT DUSTER

Filed March 13, 1957  2 Sheets-Sheet 1

INVENTOR.
GILES E. BULLOCK
BY

Nov. 22, 1960  G. E. BULLOCK  2,961,129
PLANT DUSTER
Filed March 13, 1957  2 Sheets-Sheet 2
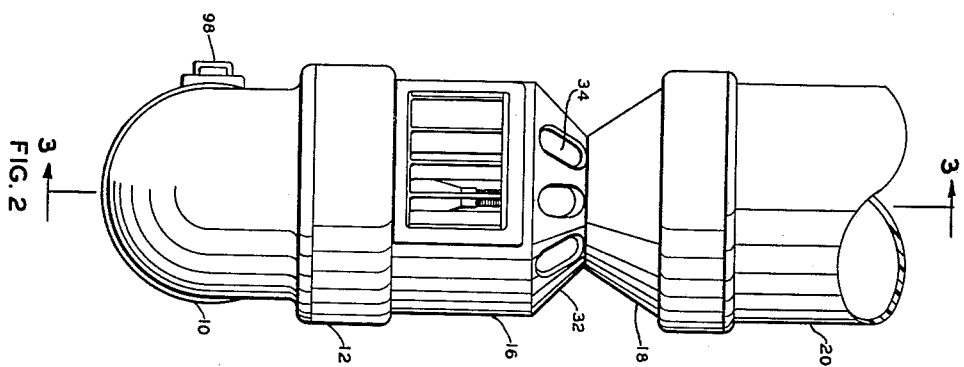
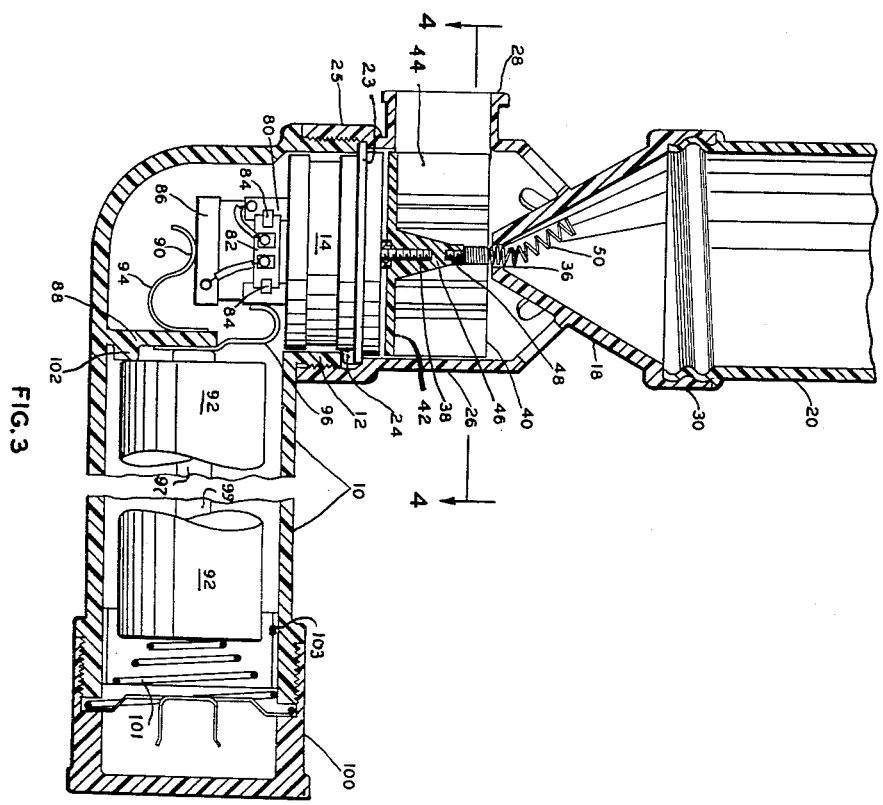

United States Patent Office 2,961,129
Patented Nov. 22, 1960

2,961,129

PLANT DUSTER

Giles E. Bullock, 2096 Elmwood Ave., Rochester, N.Y.

Filed Mar. 13, 1957, Ser. No. 645,734

1 Claim. (Cl. 222—193)

This invention relates to plant dusters, and more particularly to a portable duster utilizing a centrifugal electrically driven blower.

Plant dusters of the hand portable type, have heretofore operated by air blasts produced by hand actuated reciprocating pumps of the cylinder and piston type, for producing the carrying air flow. Such dusters produce an irregular flow of dust, require considerable effort to supply the necessary blast of air, and are difficult to hold steady during the application, because of the manual actuation required.

The present invention is directed to a duster of a handy portable light-weight size, having a small electrically operated blower powered by small self contained dry cells. The invention further is provided with a gravity flow magazine and agitating means therefor, whereby flow from the magazine into the blower is steady, caking or lumping of the dust is prevented, and a uniform cloud of dust is propelled from the blower with a velocity suitable for treating plant life.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 2 is an end elevational view of the duster;

Figure 3 is a sectional view taken substantially on the line 3—3 of Figure 2;

Figure 4:
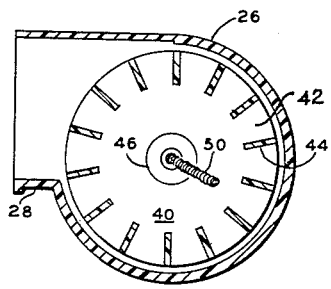
Figure 4 is a sectional view taken substantially on the line 4—4 of Figure 3.
Figure 1:
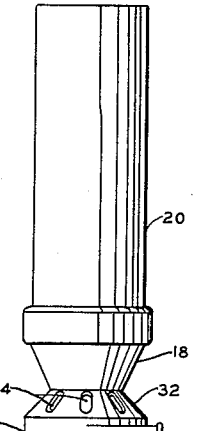
Figure 1 is a side elevational view of the duster.
Figures 5, 6, 7:
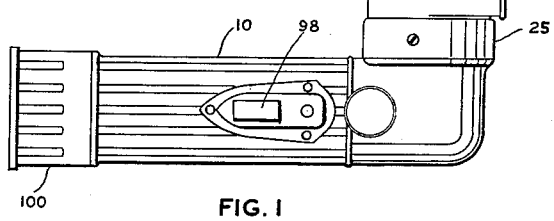
Figure 5 is a sectional view through the motor field with the armature shown in elevation, substantially on line 5—5 of Figure 6.
Figure 6 is an axial sectional view through the motor taken substantially on line 6—6 of Figure 5 with the armature shown in elevation.
Figure 7 is a transverse sectional view of the commutator taken on line 7—7 of Figure 6.
Figure 8:
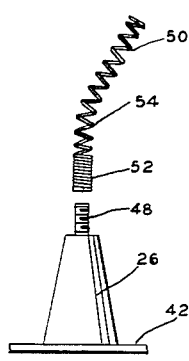
Figure 8 is an enlarged view of the agitator.

Referring to the drawings, there is shown a battery casing 10 which serves as a handle grip, the casing having at one end an upwardly projecting annular collar 12, within which is housed a blower motor 14, the collar also being adapted to receive a blower housing 16, the upper end of which is formed to provide a conical feed hopper 18, and a support for a magazine 20.

Referring to Figures 2, 3 and 4, it will be seen that the casing and grip 10 comprises a hollow tubular cylindrical body portion having at one end the externally threaded collar 12, which extends upwardly along an axis disposed at right angles to the axis of the body portion. The collar is adapted to receive the motor assembly 14, which closely fits within the collar, the assembly having an annular shoulder 23 adapted to engage the end of the collar 12.

The blower housing comprises an internally threaded end sleeve 25 adapted to engage the threaded collar 12, and a cylindrical wall portion 26, having a tangential discharge outlet or nozzle 28. Integral therewith is the conical hopper 18, the upper end of which is provided with an enlarged internally threaded collar 30 to receive the threaded end of the dust magazine 20. The conical hopper is joined to the cylindrical wall portion by a conical wall 32, having therein a plurality of air inlet ports 34. The sleeve 25 provides an offset that is adapted to clamp the shoulder 23 against the end of the flange 12.

The lower end of the hopper is provided with an outlet aperture 36, in alignment with the motor and blower axis. The motor has a shaft 38, projecting therefrom on which is screw threaded a multiple vane impeller 40, the impeller being integrally formed with a circular end disc 42, having a plurality of radially disposed upstanding rectangular vanes 44 having a radial length of about one-third of the radius of the disc and a hub 46. The hub is screw threaded on the shaft end, and is further provided with an upwardly extending threaded stud or stub shaft extension 48.

It will be seen that the hopper outlet extends to, and may, if desired, extend somewhat into the central space within the orbit traversed by the impeller vanes. An agitator 50 is adapted to cause the dust to flow evenly from the hopper into the central area within the impeller and projects upwardly through the hopper outlet. Such agitator may have a coil spring end 52 adapted to screw thread on the impeller extension 48, and an end 54 adapted to extend upwardly at an angle to the shaft axis, up into the hopper. It may be formed to in effect sweep the conical hopper wall, or gyrate in a conical path spaced therefrom.

The motor is a sealed unit, of the permanent magnet field type, and is enclosed within plastic housing parts 60 and 62. The field pole pieces 64 and 66 are magnetized by permanent magnets 68. The armature 70 and its commutator are mounted on a shaft 72 journalled in bearing inserts 74 and 76. The tubular extension 78 of the housing part 62 is provided with an external metallic connector band 80 which holds in place an arcuate brush support panel 82 of insulating material, by return-bent fingers 84. The extension is also provided with a metallic connector cap 86. The band 80 and cap 86 are connected to the respective brushes.

Within the casing, adjacent the motor end, is a transverse partial partition 88, having on one side a contact member 96, adapted to connect with the positive terminal of a standard flashlight cell 92. The resilient free end of the member is adapted to yieldingly control the band 80. Another terminal mounted on the other side of the partition 88, is provided with a contact spring 94 adapted to contact the cap 86 as at 90, when properly assembled in the position shown in Figure 2. Connections, in the form of metal straps 97 and 99, extend from the contact spring 94 through the manual switch 98 to an end contact band 103, and thence the usual end contact spring 101 of the battery casing cap 100. Since the motor rotates according to polarity of the voltage applied thereto, and rotation in the correct direction only is desired, a small boss 102 can be molded into the partition 88, of insufficient height to prevent contact of the projecting positive battery terminal with the contact 96, but sufficient to prevent contact of the negative terminal, which generally comprises the entire flat circular opposite end of the dry cell, should the cell be inserted, inadvertently in a reverse position.

The various parts are readily assembled, the motor assembly being seated with its shoulder 23 seated on the end of the collar 12. The collar 12, is notched to receive a keying lug 24, to assure proper orientation of the motor assembly for proper connection to the contact 96 on assembly. The spring 52 is threaded on the stub 48, so as to tighten upon rotation of the impeller in the proper direction. While a helical coil agitator is shown, agitation may be had by a light guage stiff straight wire extending up into the hopper at an angle to the rotation axis. The size of the hopper opening, the size of the coils, or diameter of wire have an effect upon the rate of discharge from the magazine. Because the magazine is sealed, except for the outlet aperture 36 in the feed hopper, flow is by gravity, and controlled by the agitation. As soon as the finely divided dust, in the form of finely divided powdered insecticide, fungicide or the like, reaches the central region of the impeller, it is picked up by the air drawn in through the ports 34, and blown out the discharge orifice in a finely divided easily directed cloud or stream. By reason of the light-weight of the blower, the uniform discharge, and the ease with which the motor can be manually switched on or off as at 98, the dust may be applied efficiently to the plants or portions thereof that require treatment, without indiscriminate waste. The magazine, being preferably transparent, at all times shows the reserve supply, and is quickly unscrewed for refill. The force of the blast is sufficient to direct the stream where wanted, even against a light breeze. The hopper and blower casing may be formed of clear plastic, if desired, so that the operative parts may always be subject to observance and inspection.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

What is claimed is:

A portable hand plant duster comprising, a tubular dust magazine, a conical hopper therebelow detachably connected to the magazine, said hopper having a relatively small discharge opening, a rotary blower disposed substantially coaxially below the hopper, said blower having a casing having a tangential discharge outlet for directing a dust stream in a direction generally at right angles to the axis of said hopper and blower and having a rotary impeller within said casing having a circular plate located immediately below said outlet, said plate having a plurality of upstanding blades lying in radial planes adjacent its marginal edge, said blades having an axial length approximating the axial width of said outlet, and extending radially inwardly about one third of the radius of said plate, said blower casing having an upwardly extending portion extending to the outside wall of said hopper, said upwardly extending portion having a plurality of relatively large air inlet ports circumferentially disposed therearound and above the blades of said impeller, agitating means affixed to said impeller and extending up into said hopper at an angle to the impeller axis for controlling the gravity flow of dust from said magazine to said blower, a motor mounted below said blower for driving said impeller, and a hollow handle secured to said casing and extending in a direction opposite from that of said outlet, said handle containing electric cells for energizing said motor.

References Cited in the file of this patent

UNITED STATES PATENTS

| | | |
|---|---|---|
| 1,093,820 | Beach | Apr. 21, 1914 |
| 2,686,045 | Byberg | Aug. 10, 1954 |
| 2,750,104 | Scaroulis | June 12, 1956 |

FOREIGN PATENTS

| | | |
|---|---|---|
| 616,799 | Germany | Aug. 7, 1935 |
| 816,777 | Germany | Oct. 11, 1951 |
| 923,737 | Germany | Feb. 21, 1955 |
| 927,597 | Germany | May 12, 1955 |